(12) United States Patent
Kojima

(10) Patent No.: US 9,274,490 B2
(45) Date of Patent: Mar. 1, 2016

(54) POWER SUPPLY APPARATUS AND IMAGE FORMING APPARATUS

(71) Applicant: CANON KABUSHIKI KAISHA, Tokyo (JP)

(72) Inventor: Keizo Kojima, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1 day.

(21) Appl. No.: 14/321,056

(22) Filed: Jul. 1, 2014

(65) Prior Publication Data

US 2015/0016152 A1    Jan. 15, 2015

(30) Foreign Application Priority Data

Jul. 12, 2013 (JP) .................................. 2013-146375

(51) Int. Cl.
*G03G 15/00* (2006.01)
*H02M 3/335* (2006.01)

(52) U.S. Cl.
CPC ........... *G03G 15/80* (2013.01); *H02M 3/33523* (2013.01); *H02M 3/33569* (2013.01)

(58) Field of Classification Search
USPC .............................................. 399/37, 80, 130
See application file for complete search history.

(56) References Cited

U.S. PATENT DOCUMENTS

| | | | |
|---|---|---|---|
| 6,131,459 A * | 10/2000 | Seale et al. ....................... 73/633 |
| 7,880,440 B2 * | 2/2011 | Takahashi et al. ............. 320/139 |
| 8,891,997 B2 | 11/2014 | Samejima et al. |
| 2004/0057740 A1 * | 3/2004 | Inukai .............................. 399/66 |
| 2005/0068792 A1 * | 3/2005 | Yasumura ................... 363/21.06 |
| 2009/0272735 A1 * | 11/2009 | Suenaga et al. ................ 219/702 |
| 2011/0228566 A1 * | 9/2011 | Liang ......................... 363/21.02 |
| 2011/0261592 A1 | 10/2011 | Samejima et al. |
| 2012/0188797 A1 * | 7/2012 | Nakanishi ................... 363/21.02 |
| 2013/0064566 A1 | 3/2013 | Kojima |

FOREIGN PATENT DOCUMENTS

JP       3013697 B2     2/2000
WO    2011/132275 A1   10/2011

* cited by examiner

*Primary Examiner* — Clayton E Laballe
*Assistant Examiner* — Linda B Smith
(74) *Attorney, Agent, or Firm* — Fitzpatrick, Cella, Harper & Scinto

(57) ABSTRACT

A power supply apparatus includes a transformer and a switching unit that causes two switching elements connected in series to drive the primary winding of the transformer. A detection unit detects current flowing on the primary side of the transformer and outputs a voltage corresponding to the detected current. A correction unit corrects the voltage output from the detection unit into a voltage proportional to a variation of an input voltage input into the primary side of the transformer A nonlinear correction unit corrects the corrected voltage corrected by the correction unit to be nonlinear independently of variation in the input voltage.

16 Claims, 14 Drawing Sheets

POWER SUPPLY APPARATUS AND IMAGE FORMING APPARATUS

BACKGROUND OF THE INVENTION

1. Field of the Invention

The present invention relates to a power supply apparatus and an image forming apparatus and, in particular, to a power supply apparatus that includes a current resonance power supply.

2. Description of the Related Art

FIG. 6A is a diagram illustrating an overview of a circuit of a conventional current resonance power supply apparatus (hereinafter, simply called power supply apparatus). Detailed description of FIG. 6A will be made later. A power supply apparatus as illustrated in FIG. 6A detects overcurrent, based on a current detection voltage that occurs across both terminals of a current detection resistor 109 and is input into an OCP terminal of a power supply control IC 110. In the power supply apparatus illustrated in FIG. 6A, the resistor 109 is connected to a resonance circuit in series. Resonance current flows through the resistor 109. Accordingly, the power loss is large. The larger the current flowing through a load 128 is, the larger the normal rated power of a resistor required to be adopted is. Accordingly, the efficiency of the power supply apparatus is reduced. This reduction causes the need to adopt a resistor having a large normal rated power. Accordingly, the cost increases by that for the resistor. In the case of connecting multiple resistors in parallel or series to configure a current detection resistor 109, a large space is required. Thus, for instance, Japanese Patent No. 3013697 proposes a power supply apparatus as illustrated in FIG. 6B. Detailed description on FIG. 6B will be made later. The power supply apparatus in FIG. 6B converts, into a voltage, current flowing through a current detection capacitor 201 connected to a current resonance capacitor 108 in parallel, and inputs the voltage into an OCP terminal of the power supply control IC 110, thereby detecting overcurrent.

However, when the input AC voltage varies, current flowing through the resistor 109 in the case of the power supply apparatus in FIG. 6A and current flowing through the capacitor 201 in the case of the power supply apparatus in FIG. 6B vary inversely with variation in the input AC voltage. As a result, there is a possibility of performing an overcurrent protection operation with an inconstant value of current flowing through the load 128. To address this point, for instance, International Publication No. WO2011/132275 proposes a power supply apparatus as illustrated in FIG. 7A. FIG. 7A will be described later in detail. The power supply apparatus in FIG. 7A has a configuration of applying a correction voltage in proportion to the input AC voltage. This configuration suppresses variation in current value detected by a current detection circuit due to variation in voltage of a commercial AC power supply. The power supply apparatus illustrated in FIG. 7A can perform a more stable overcurrent protection operation than the power supply apparatuses in the foregoing FIGS. 6A and 6B even if the input AC voltage varies.

However, in the power supply apparatus illustrated in FIG. 7A, a correction voltage (1402) to be applied to the current detection circuit exhibits linear characteristics in proportion to the input voltage, as illustrated in FIG. 7B. In contrast, the output voltage (1401) of the current detection circuit exhibits nonlinear characteristics to variation in voltage of a commercial AC power supply. Accordingly, as illustrated in FIG. 7B, this apparatus exhibits a waveform 1403 similar to the waveform of the output voltage of the OCP terminal of the conventional power supply control IC 110, in comparison with an ideal output voltage of the OCP terminal (broken line) of the power supply control IC. Accordingly, this apparatus cannot exert sufficient correction effects against variation in voltage of a commercial AC power supply.

Recently, in every field, reduction in size and energy of products has been advanced. As a result, there is a tendency that reduction in size and energy of a power supply apparatus has also been advanced. In the case of a current resonance power supply apparatus, increase in current flowing through a load 128 causes a phenomenon that flow-through current occurs in both switching FETs 106 and 107 (hereinafter, simply called an off-resonance phenomenon). There is a possibility that the off-resonance phenomenon causes counter-current to flow through the body diode of an off-state FET between the switching FETs 106 and 107, thereby breaking the off-state FET. As described above, in the case of performing an overcurrent protection operation with an inconstant value of current flowing through the load 128, it is required to prevent an off-resonance phenomenon from occurring in a condition of an AC voltage input when the maximum current flows through the load 128. This requirement increases the size of a transformer 115 and the current resonance capacitor 108, which are main parts for determining the output voltage. This increase causes a problem against reduction in size of the power supply apparatus.

SUMMARY OF THE INVENTION

The present invention has been made in such situations, and enables the size of an apparatus to be reduced while improving the overcurrent detection accuracy.

A purpose of the present is to provide a power supply apparatus that includes a transformer that includes a primary winding, a secondary winding and an auxiliary winding, a switching unit that includes first and second switching elements that are connected in series, and drives the primary winding, a resonance capacitor that is connected to one end of the primary winding, a control device that controls the first switching element and the second switching element to be alternately turned on and off, for resonating the primary winding and the resonance capacitor to output a DC voltage to a load connected to the secondary winding, a detection unit that detects current flowing through the primary winding, a correction unit that corrects a detection result of the detection unit, according to an input voltage input into the transformer, and a nonlinear correction unit that corrects the detection result such that correction by the correction unit is nonlinear to the input voltage.

Another purpose of the present invention is to provide an image forming apparatus that includes an image forming unit that forms an image, and a power supply that supplies power for operating the image forming unit, wherein the power supply includes, a transformer that includes a primary winding, a secondary winding and an auxiliary winding; a switching unit that includes first and second switching elements that are connected in series, and drives the primary winding, a resonance capacitor that is connected to one end of the primary winding, a control device that controls the first switching element and the second switching element to be alternately turned on and off, for resonating the primary winding and the resonance capacitor to output a DC voltage to a load connected to the secondary winding; a detection unit that detects current flowing through the primary winding, a correction unit that corrects a detection result of the detection unit, according to an input voltage input into the transformer;

and a nonlinear correction unit that corrects the detection result such that correction by the correction unit is nonlinear to the input voltage.

A further purpose of the present invention will be apparent with reference to the following detailed description and the accompanying drawings.

DESCRIPTION OF THE EMBODIMENTS

Preferred embodiments of the present invention will now be described in detail in accordance with the accompanying drawings.

Hereinafter, modes for implementing the present invention are described in detail according to embodiments with reference to the diagrams. For comparison with the embodiments, which will be described below, conventional power supply apparatuses in FIGS. 6A, 6B, 7A and 7B are described.

[Configuration of Power Supply Apparatus]

Figure 6A:
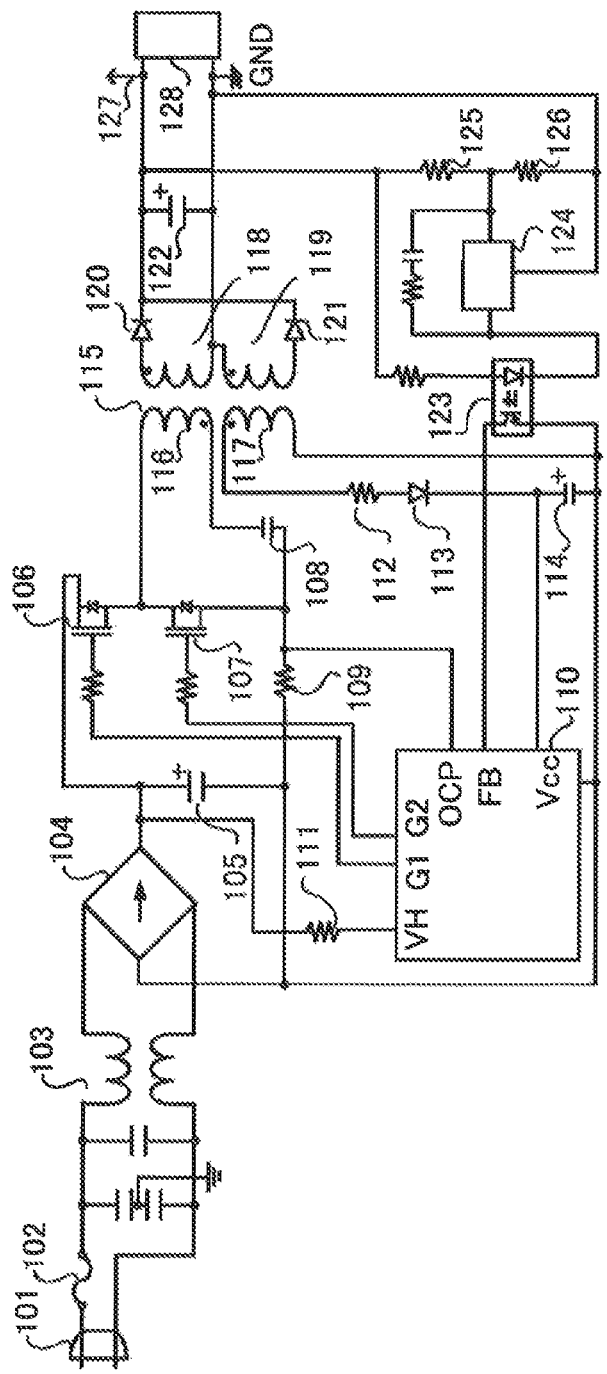
FIGS. 6A and 6B illustrate circuits of conventional current resonance power supply apparatuses.

FIG. 6A is a diagram illustrating an overview of a circuit of a conventional current resonance power supply apparatus (hereinafter, simply called a power supply apparatus). The power supply apparatus includes an inlet 101, a fuse 102, a common mode coil 103, a rectifier diode bridge 104, and a primary smoothing capacitor 105. The power supply apparatus further includes: switching FETs (hereinafter, simply called FETs) 106 and 107, which are a first switching unit and a second switching unit; a current resonance capacitor 108; a current detection resistor 109; and a power supply control IC 110. The power supply apparatus further includes: a startup resistor 111; a resistor 112; a diode 113; a capacitor 114; and a transformer 115. Here, the startup resistor 111 is connected to a VH terminal of the power supply control IC 110. The transformer 115 includes a primary winding 116, an auxiliary winding 117, and secondary windings 118 and 119. The FETs 106 and 107 are connected to one end of the primary winding 116. The current resonance capacitor 108 is connected to the other end of the primary winding 116. Furthermore, the power supply apparatus includes rectifier diodes 120 and 121, a smoothing capacitor 122, a photocoupler 123, a shunt regulator 124, regulation resistors 125 and 126, and a voltage output unit 127. The load 128 is connected to the power supply apparatus, and supplied with power from the power supply apparatus.

The power supply control IC 110 controls on and off periods of a control signal to be supplied to each gate terminal of the FETs 106 and 107 (hereinafter, called on and off periods) such that an DC voltage output from the voltage output unit 127 is constant. The power supply control IC 110 outputs a control signal for controlling the FET 106 from a G1 terminal and outputs a control signal for controlling the FET 107 from a G2 terminal. A voltage of the auxiliary winding 117 of the transformer 115 is rectified and smoothed by a rectifying and smoothing circuit that includes the resistor 112, the diode 113 and the capacitor 114 and then input into the Vcc terminal of the power supply control IC 110. That is, a voltage output from the rectifying and smoothing circuit connected to the auxiliary winding 117 is supplied as power supply for driving the power supply control IC 110.

When a voltage is input from a commercial AC power supply, not illustrated, via the startup resistor 111 into the VH terminal of the power supply control IC 110, the control signals are output from the G1 terminal and the G2 terminal of the power supply control IC 110 to the gate terminals of the FET 106 and the FET 107, respectively. At this time, the control signal output from the G1 terminal and the control signal output from the G2 terminal are output so as to alternately turning on and off the FET 106 and the FET 107. Here, control of alternately turning on and off the respective FETs 106 and 107 is control that causes the FET 107 to be off while the FET 106 is on and causes the FET 107 to be on while the FET 106 is off. When the FET 106 and the FET 107 start the on and off operation, the voltage of the primary smoothing capacitor 105 is applied to the primary winding 116 of the transformer 115. This application causes AC current to flow through the primary winding 116.

Hereinafter, the flow of the AC current is sequentially described in conformity with the on and off states of the FET 106 and the FET 107.

(1) While the FET 106 is in the on state and the FET 107 is in the off state, current flows along a path of the primary smoothing capacitor 105→the FET 106→the primary winding 116 of the transformer 115→the current resonance capacitor 108→the current detection resistor 109→the primary smoothing capacitor 105.

(2) While the FET 106 is in the off state and the FET 107 is also in the off state, current flowing through the primary winding 116 of the transformer 115 is caused to be maintained even if the FET 106 transitions from the on state to the off state. Accordingly, the current flows along the following path. That is, current flows along the path of the primary winding 116 of the transformer 115→the current resonance capacitor 108→a parasitic diode embedded in the FET 107.

(3) While the FET 106 is in the off state and the FET 107 is in the on state, the current continuously flows along the path of the primary winding 116 of the transformer 115→the current resonance capacitor 108→the FET 107 even if the FET 107 transitions to the on state in the (2) state. However, the resonance action between the leakage inductance of the transformer 115 and the current resonance capacitor 108 gradually changes the current to the path of the current resonance capacitor 108→the primary winding 116 of the transformer 115→the FET 107.

(4) While the FET 106 is in the off state and the FET 107 is in the off state, the current flowing through the primary winding 116 of the transformer 115 is caused to be maintained even if the FET 107 transitions to the off state in the (3) state. Accordingly, the current flows along the following path. That is, the current flows along the path of the primary winding 116 of the transformer 115→the parasitic diode embedded in the FET 106→the primary smoothing capacitor 105.

(5) While the FET 106 is in the on state and the FET 107 is in the off state, the current continuously flows along the path of the primary winding 116 of the transformer 115→switching FET 106→primary smoothing capacitor 105 even if the switching FET 106 transitions to the on state in the (4) state. However, the resonance action between the leakage inductance of the transformer 115 and the current resonance capacitor 108 gradually changes the current as follows. That is, the path is changed to the path of the primary smoothing capacitor 105→the switching FET 106→the primary winding 116 of the transformer 115→the current resonance capacitor 108→the current detection resistor 109→the primary smoothing capacitor 105.

Thus, AC current flows through the primary winding 116 of the transformer 115 in the forward direction or the reverse direction (see FIGS. 8A and 8B (the details will be described later)). Accordingly, AC current is induced in the secondary windings 118 and 119 of the transformer 115. The voltage induced in the secondary windings 118 and 119 is rectified and smoothed by the rectifying and smoothing circuit, which includes the two rectifier diodes 120 and 121 and the smoothing capacitor 122. The rectified and smoothed voltage is output as a DC voltage from the voltage output unit 127. The voltage of the voltage output unit 127 is divided by the regulation resistors 125 and 126. The divided voltages are input into the shunt regulator 124. The shunt regulator 124 generates a feedback signal according to the input voltage level. The feedback signal is input into an FB terminal of the power supply control IC 110 via the photocoupler 123, thereby being fed back. The power supply control IC 110 controls the switching timing of the FET 106 and the FET 107 based on the feedback signal input into the FB terminal. Such control by the power supply control IC 110 causes a stable DC voltage to be output from the voltage output unit 127.

At this time, AC voltage is also induced in the auxiliary winding 117 of the transformer 115. The induced voltage is rectified and smoothed by the resistor 112, the diode 113 and the capacitor 114. The rectified and smoothed voltage is supplied to the Vcc terminal as a voltage of the power supply for driving the power supply control IC 110. When the voltage is thus supplied as power supply for driving the power supply control IC 110 from the auxiliary winding 117 of the transformer 115, the voltage supply from the startup resistor 111 does not function.

[Overcurrent Detection Method 1]

Concerning the power supply apparatus as illustrated in FIG. 6A, there is a certain overcurrent detection method for current flowing through the load 128. This method inputs the current detection voltage caused across both terminals of the current detection resistor 109 into the OCP terminal of the power supply control IC 110, thereby performing detection. The power supply control IC 110 detects overcurrent, based on the detection result by the current detection resistor 109. The current detection voltage input into the OCP terminal of the power supply control IC 110 is high if the current flowing through the load 128 is high. When the current detection voltage input into the OCP terminal exceeds a voltage determined by the power supply control IC 110, the power supply control IC 110 stops the operation of the FET 106 and the FET 107. Thus, the power supply control IC 110 performs the overcurrent protection operation.

However, in the power supply apparatus illustrated in FIG. 6A, the resistor 109 is connected to the resonance circuit in series. The entire resonance current flows into the resistor 109. Accordingly, the power loss is large. The larger the current flowing through the load 128 is, the larger the normal rated power of the resistor required to be adopted is. Accordingly, the efficiency of the power supply apparatus is reduced. This reduction causes the need to adopt a resistor having a high normal rated power. Accordingly, the cost increases by that of the resistor. Furthermore, in the case of connecting multiple resistors in parallel or series to configure the current detection resistor 109, a large space is required.

[Overcurrent Detection Method 2]

Figure 6B:
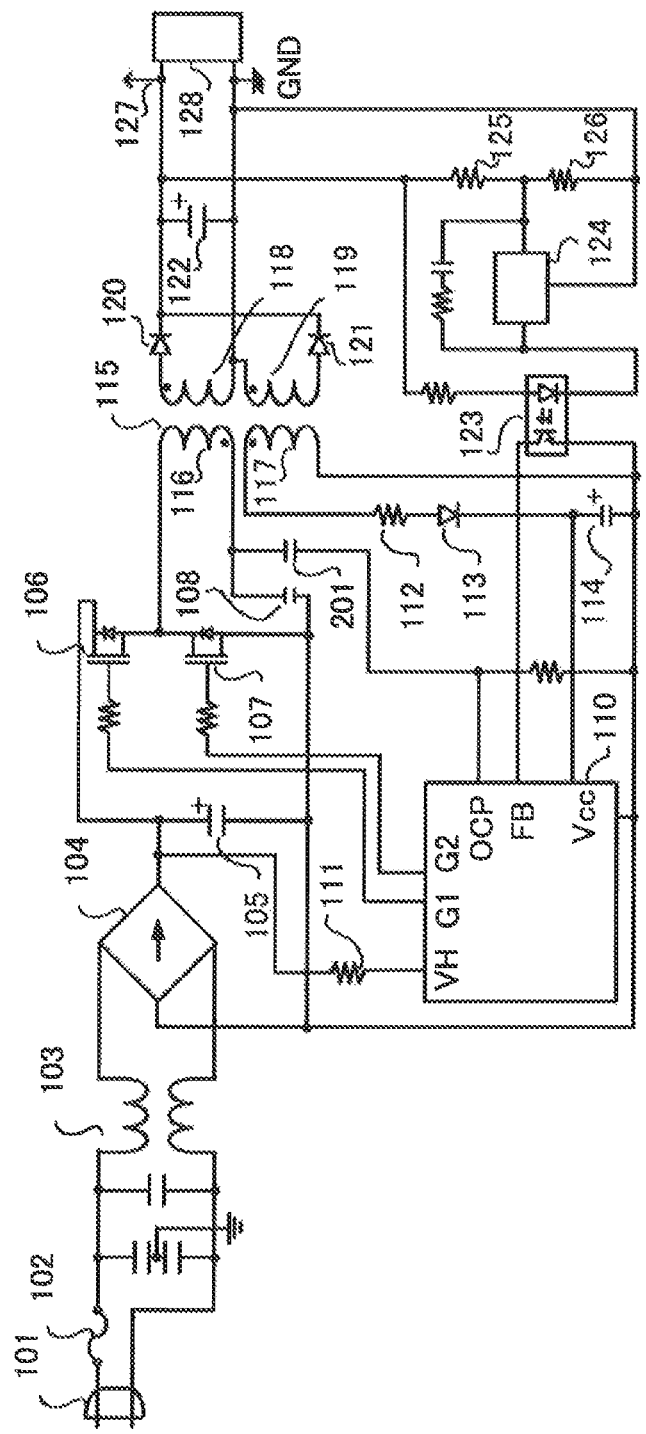

To solve the foregoing problem of the overcurrent detection method 1, for instance, the power supply apparatus as illustrated in FIG. 6B has been proposed. The same symbols are assigned to the same components as the components in FIG. 6A. The description thereof is omitted. In the power supply apparatus in FIG. 6B, the method converts the current flowing through the current detection capacitor 201 connected in parallel with the current resonance capacitor 108 into a voltage, inputs this voltage into the OCP terminal of the power supply control IC 110, and causes the power supply control IC to perform detection.

[Correction of Varying Input Voltage]

Figure 7A:
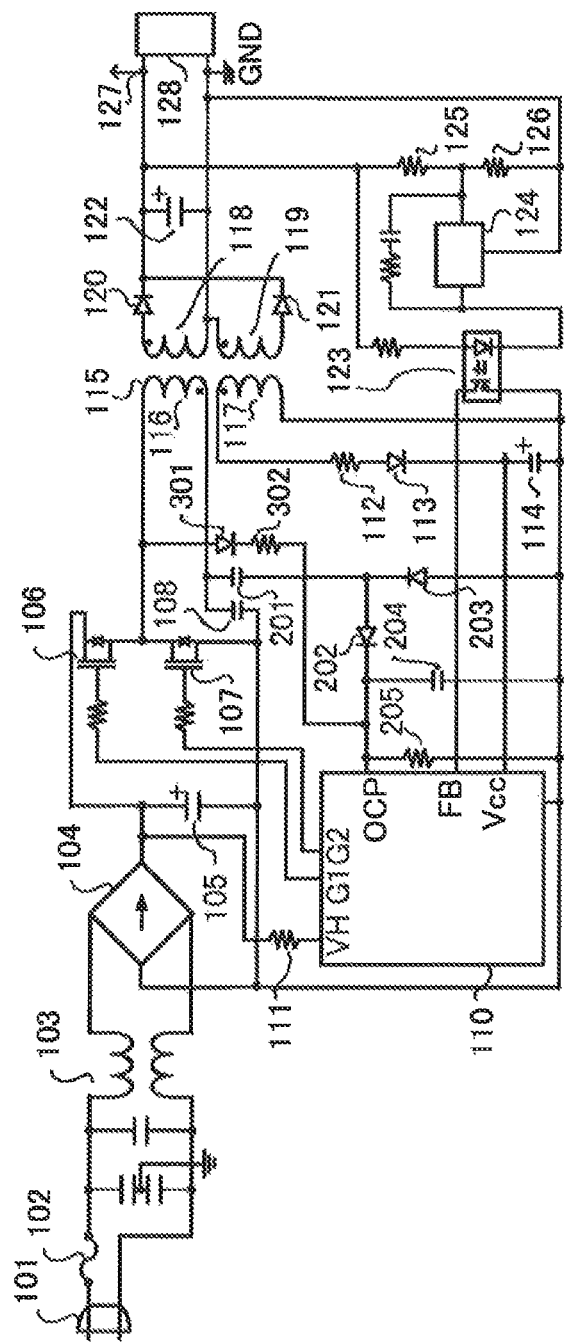
FIG. 7A illustrates a circuit of a configuration of a conventional current resonance power supply apparatus.

In the foregoing two power supply apparatuses according to the overcurrent detection methods, it is postulated that the current flowing through the load 128 always the same and the power supply control IC 110 on the primary side performs the overcurrent protection operation. However, if the input AC voltage varies, the overcurrent protection operation is unfortunately performed with an inconstant value of current flowing through the load 128. This phenomenon occurs as a result where, in the case of outputting a constant power on the secondary side, the power supply control IC 110 performs control so as to cause the power on the primary side to be also constant. Accordingly, if the input AC voltage varies, current flowing through the resistor 109 in the case of the overcurrent detection method 1 and current flowing through the capacitor 201 in the case of the overcurrent detection method 2 vary inversely with variation in the input AC voltage, respectively. As a result, variation in the input AC voltage causes the overcurrent protection operation to be performed with an inconstant value of current flowing through the load 128. Thus, the power supply apparatus as illustrated in FIG. 7A has been proposed. The power supply apparatus in FIG. 7A has a configuration that includes the current detection circuit and an input AC voltage correction circuit. The current detection circuit includes the capacitor 201, diodes 202 and 203, a capacitor 204 and a resistor 205. The same symbols are assigned to the same components as the components in FIG. 6A. The description thereof is omitted. The power supply apparatus in FIG. 7A has the configuration that applies a correction voltage in proportion with the input AC voltage to the output voltage of the current detection circuit by the input AC voltage correction circuit, which includes a diode 301, a resistor 302, and the resistor 205 (shared with the current detection circuit). Accordingly, the power supply apparatus in FIG. 7A suppresses the current value detected by the current detection circuit from varying due to variation in voltage of the commercial AC power supply.

Figure 7B:
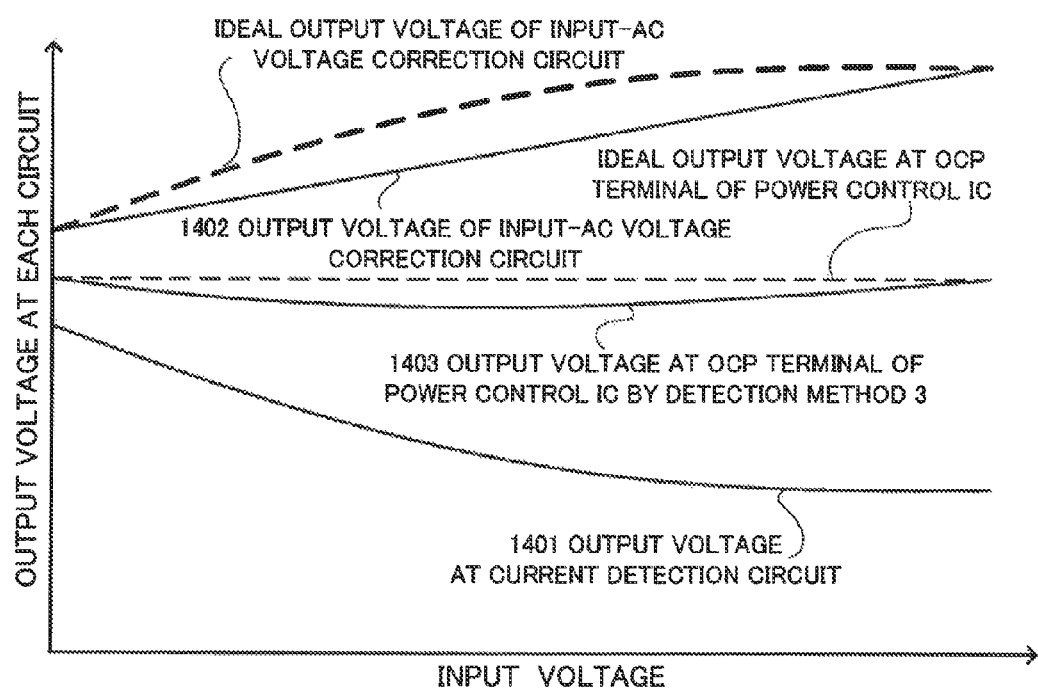
FIG. 7B illustrates an input voltage and an output voltage at each circuit.

The power supply apparatus illustrated in FIG. 7A can perform stable overcurrent protection even if the input AC voltage varies, in comparison with the foregoing overcurrent detection methods according to the power supply apparatuses in FIGS. 6A and 6B. However, the power supply apparatus illustrated in FIG. 7A has the following problem. Here, FIG. 7B is a graph with an abscissa axis representing the input voltage and an ordinate axis representing the output voltage at each circuit. FIG. 7B illustrates linear characteristics where the correction voltage (1402) applied to the current detection circuit is in proportion to the input voltage. In contrast, the output voltage (1401) of the current detection circuit has nonlinear characteristics to variation in voltage of the commercial AC power supply. Accordingly, as illustrated in FIG. 7B, the voltage exhibits a waveform as with the output voltage 1403 of the OCP terminal of the power supply control IC 110 in FIG. 7A, in comparison with an ideal output voltage of the OCP terminal (broken line) of the power supply control IC. Accordingly, sufficient correction effects cannot be exerted against variation in voltage of the commercial AC power supply. As described above, to prevent off-resonance phenomenon, the sizes of the transformer 115 and the current resonance capacitor 108 are required to be increased. This increase causes a problem against reduction in size of the power supply apparatus.

Embodiment 1

[Configuration of Power Supply Apparatus]

Figure 1:
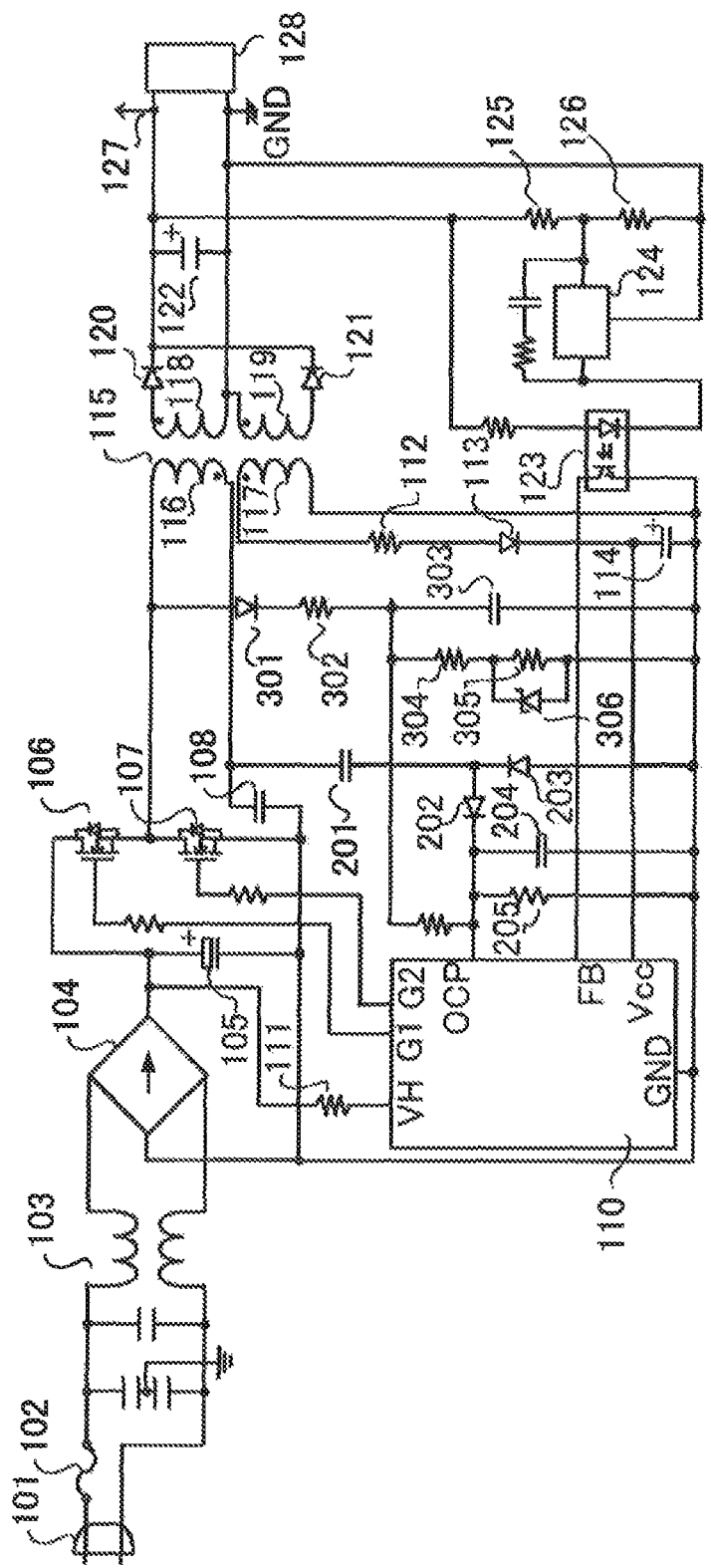
FIG. 1 illustrates a circuit diagram of a current resonance power supply apparatus of Embodiment 1.

FIG. 1 is a diagram illustrating a power supply apparatus of Embodiment 1. The same symbols are assigned to the same components of the foregoing power supply apparatus. The description thereof is omitted. The power supply apparatus of this embodiment includes a nonlinear correction circuit, which is a nonlinear correction unit. The nonlinear correction circuit includes resistors 304 and 305, a capacitor 303 and a Zener diode 306. An overcurrent detection circuit of the power supply apparatus of this embodiment includes a current detection circuit, an input AC voltage correction circuit and a nonlinear correction circuit.

The current detection circuit includes: a capacitor 201, which is a first capacitor; a first diode; diodes 202 and 203, which are a second diode; a capacitor 204, which is a second capacitor; and a resistor 205, which is a first resistor. More specifically, the current detection circuit includes the capacitor 201 whose one end is connected between the other end of the primary winding 116 and the current resonance capacitor 108, and a diode 202 whose anode is connected to the other end of the capacitor 201. Furthermore, the current detection circuit includes the diode 203 whose cathode is connected to the other end of the capacitor 201, the capacitor 204 connected to the cathode of the diode 202, and the resistor 205 whose one end is connected to the cathode of the diode 202. The input AC voltage correction circuit, which is a correction unit, includes: a diode 301, which is a third diode; resistors 302, 304 and 305, which are a second resistor, a third resistor and a fourth resistor, respectively; and a capacitor 303, which is a third capacitor. More specifically, the input AC voltage correction circuit includes the diode 301 whose anode is connected to the one end of the primary winding 116; the resistor 302 whose one end is connected to the cathode of the diode 301; and the capacitor 303 connected to the other end of the resistor 302. Furthermore, the input AC voltage correction circuit includes: the resistor 304 whose one end is connected to the other end of the resistor 302; and the resistor 305 connected to the other end of the resistor 304. The input AC voltage correction circuit is connected between the one end of the primary winding 116 and a connection point between the FET 106 and the FET 107. The nonlinear correction circuit, which is the nonlinear correction unit, includes the resistors 304 and 305, the capacitor 303 and the Zener diode 306. The resistors 304 and 305 and the capacitor 303 are shared with the input AC voltage correction circuit.

Figure 2A:
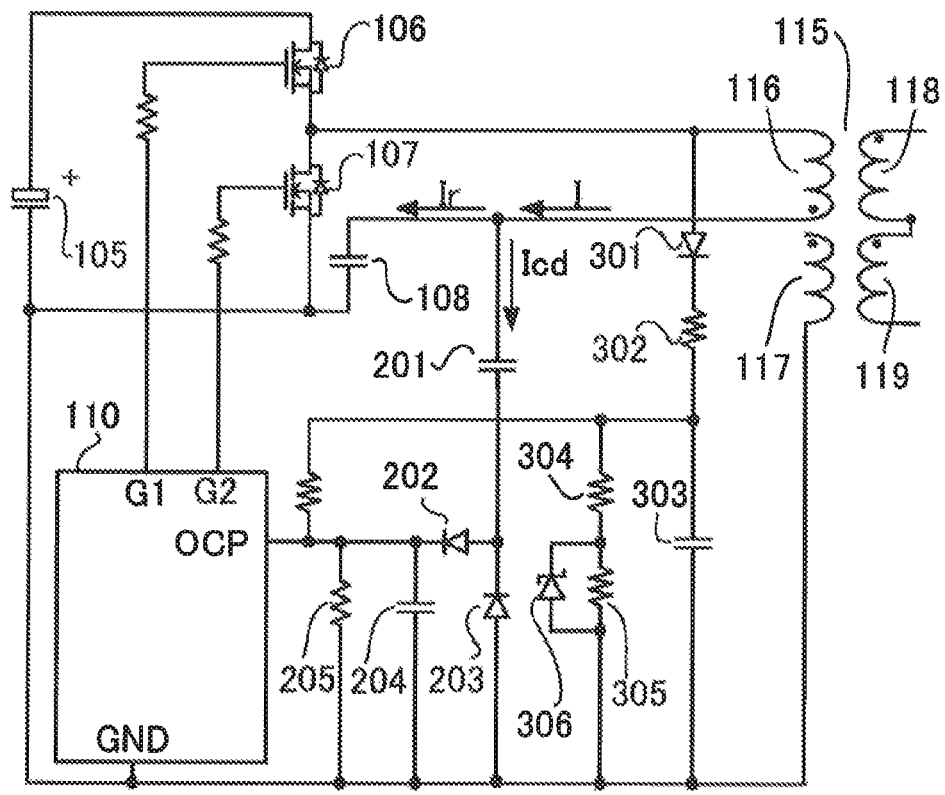
FIG. 2A is a main part of the circuit of the current resonance power supply apparatus of Embodiment 1.
Figure 2B:
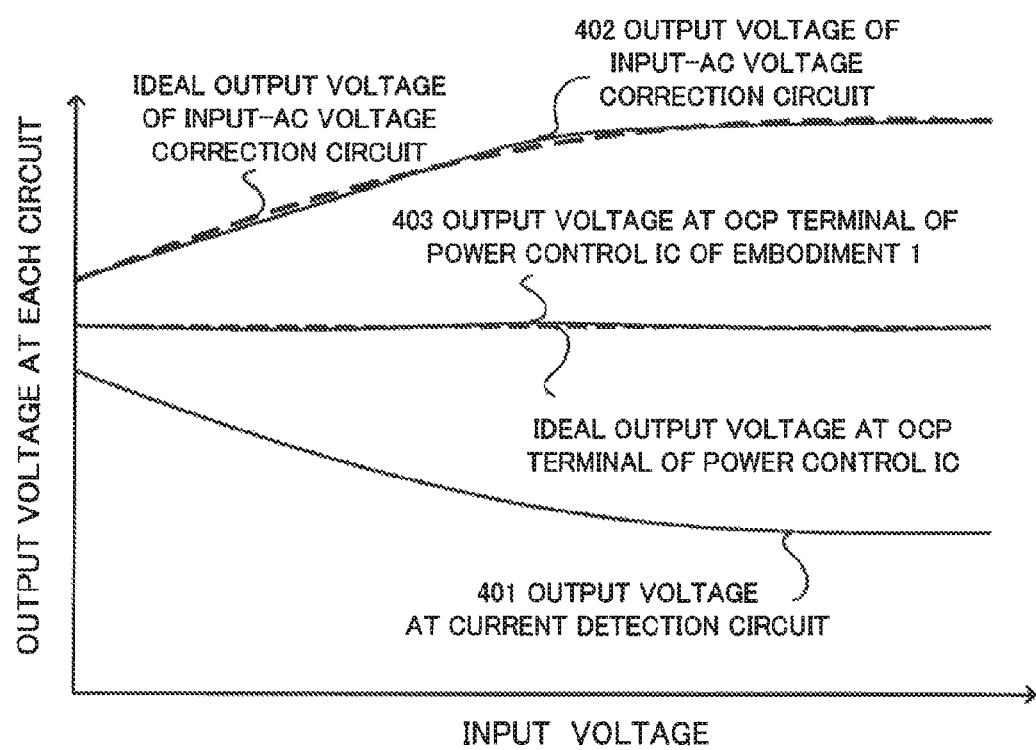
FIG. 2B illustrates an input voltage and an output voltage at each circuit.

Here, in the case where the overcurrent detection circuit does not include the input AC voltage correction circuit and the nonlinear correction circuit but only includes the current detection circuit, the voltage 401 of the OCP terminal of the power supply control IC 110 exhibits nonlinear characteristics as illustrated in FIG. 2B. Here, FIG. 2B is a graph having an abscissa axis representing the input voltage and an ordinate axis representing the output voltage at each circuit. In FIG. 2B, a thick broken line represents an ideal output voltage of the input AC voltage correction circuit, and a thin broken line represents an ideal voltage of the OCP terminal of the power supply control IC 110, respectively. FIG. 2B illustrates the output voltage 401 of the current detection circuit, and the output voltage 402 of the input AC voltage correction circuit of this embodiment, and the voltage 403 of the OCP terminal of the power supply control IC 110 of this embodiment, respectively. Nonlinear characteristics are exhibited in the case of a postulate of constant current of the load 128 and a constant voltage of the voltage output unit 127.

Figure 8A:
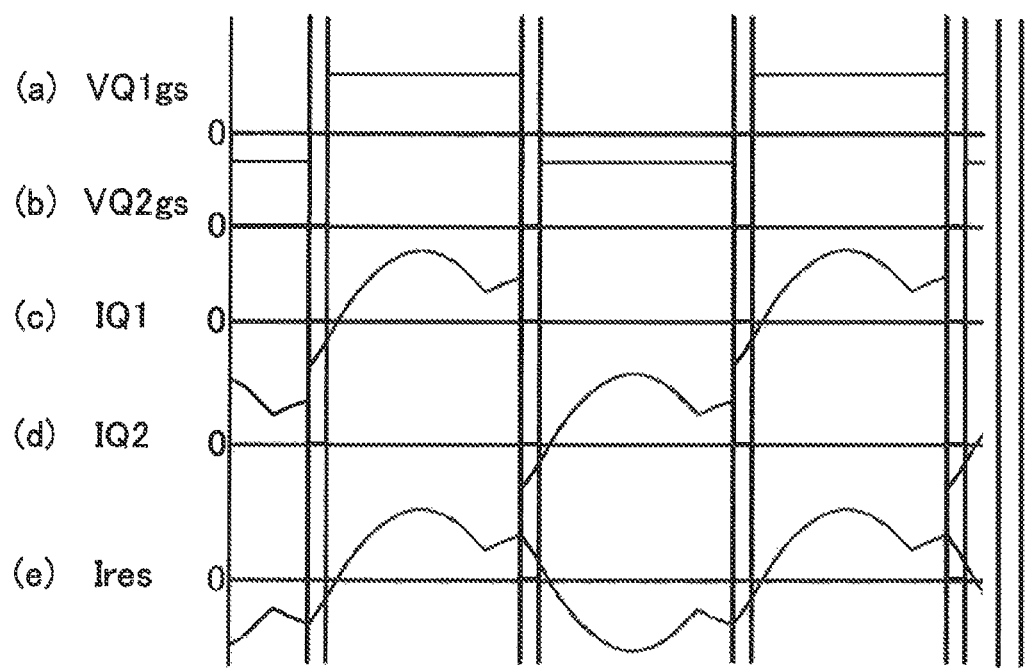
FIG. 8A illustrates a waveform of each part against variation in input AC voltage of the current resonance power supply apparatus in the case of a low input AC voltage.
Figure 8B:
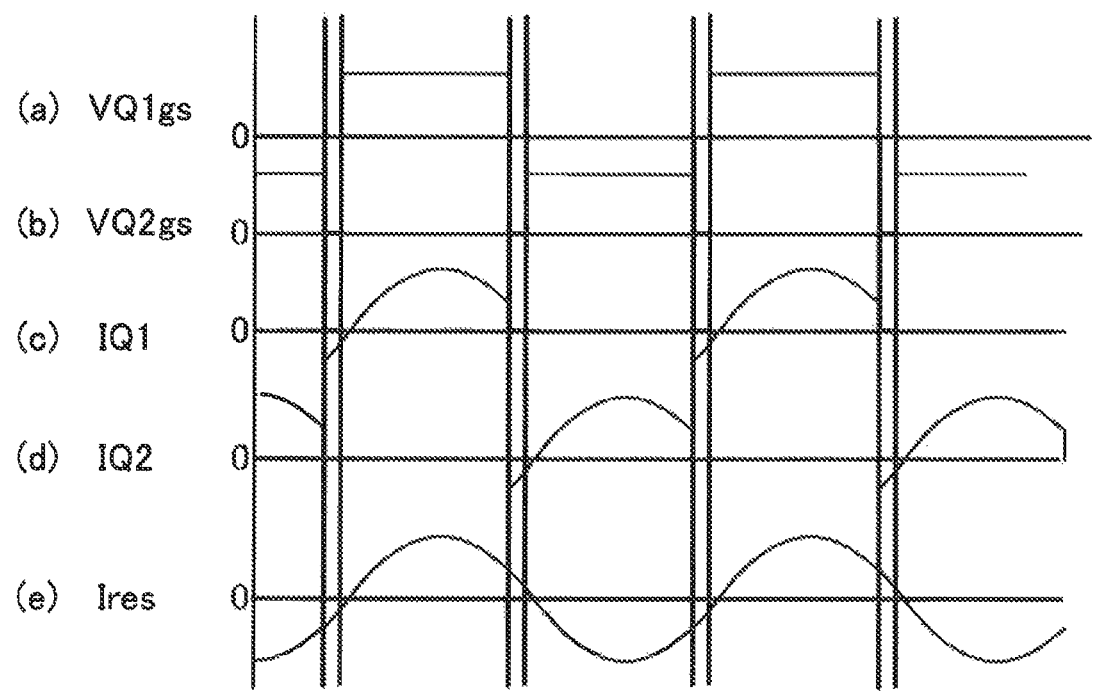
FIG. 8B illustrates a waveform of each part against variation in input AC voltage of the current resonance power supply apparatus in the case of a high input AC voltage.

This is because the primary-secondary conversion efficiency is different between the cases of the low and high input AC voltages even if a constant power is output on the secondary side, as illustrated in FIGS. 8A and 8B. Here, FIG. 8A illustrates a waveform in the case of the low input AC voltage, and FIG. 8B illustrates a waveform in the case of the high input AC voltage. (a) in FIG. 8A illustrates a waveform of a gate-source voltage VQ1gs of the FET 106. (b) in FIG. 8A illustrates a waveform of the gate-source voltage VQ2gs of the FET 107. (c) in FIG. 8A illustrates a waveform of a drain current IQ1 of the FET 106. Furthermore, (d) in FIG. 8A illustrates a waveform of a drain current IQ2 of the FET 107. (e) in FIG. 8A illustrates a waveform of a current Ires flowing between the primary winding 116 of the transformer 115 and the current resonance capacitor 108. (a) to (e) in FIG. 8B also illustrate waveforms in the same manner. As illustrated in FIG. 8B, in the case of the high input AC voltage, current flowing on the primary side, which is mainly current flowing through the capacitor 201, exhibits characteristics similar to the characteristics of a sinusoidal wave. Meanwhile, as illustrated in FIG. 8A, in the case of the low input AC voltage, current flowing on the primary side, which is mainly current flowing through the capacitor 201, is a combined wave of waveforms with different frequencies. In particular, in the case of the low input AC voltage, driving is performed at a low frequency. Thus, the operations are performed such that increase in regenerative current on the primary side secures transmission current equivalent to a power required on the secondary side. These operations are performed by the power supply control IC 110 controlling the switching frequencies of the FET 106 and the FET 107 according to the primary-secondary conversion efficiency.

Meanwhile, in the case of a configuration where the overcurrent detection circuit does not include the current detection circuit and the nonlinear correction circuit but only includes the input AC voltage correction circuit, the proportional relationship of the voltage of the OCP terminal of the power supply control IC 110 to the input AC voltage is achieved. This relationship is exhibited because the voltage of the OCP terminal of the power supply control IC 110 depends on the input AC voltage.

Here, in consideration of the nonlinear correction circuit of this embodiment, the output voltage of the input AC voltage correction circuit is discussed as follows. That is, the voltage 402 of the OCP terminal of the power supply control IC 110 exhibits nonlinear characteristics as illustrated in FIG. 2B. Thus, in the case of including the nonlinear correction circuit of this embodiment, the output (402) of the input AC voltage correction circuit exhibits characteristics similar to the ideal output voltage of the input AC voltage correction circuit (thick broken line), as illustrated in FIG. 2B. In this case, with a low input AC voltage, the voltage across both the ends of the resistor 305 is lower than the voltage of the Zener diode 306. The voltage of the OCP terminal of the power supply control IC 110 has the same value of the voltage of the case of a configuration without the current detection circuit and the nonlinear correction circuit. In contrast, with a high input AC voltage, the voltage across both the ends of the resistor 305 is the Zener voltage of the Zener diode 306. The voltage of the OCP terminal of the power supply control IC 110 has a value output from a circuit that includes the diode 301, the resistors 302 and 304, the Zener diode 306 and the capacitor 303. That is, between the cases of high and low input AC voltages, the ratio of the output voltage of the input AC voltage correction circuit to the input AC voltage is different.

An approximate calculation of the voltage of the OCP terminal of the power supply control IC 110 is as follows. FIG. 2A is a diagram illustrating an extraction of a part of the current resonance converter of the power supply apparatus in FIG. 1. In FIG. 2A, representation of elements connected to the auxiliary winding 117 and elements connected to the secondary windings 118 and 119 are omitted. Here, current I flows from the primary winding 116 of the transformer 115 via the FET 106. Current Ir flows from the primary winding 116 of the transformer 115 to the current resonance capacitor 108. Current Icd flows from the primary winding 116 of the transformer 115 to the capacitor 201. In this case, the following relationship holds $$Icd=(Ccd/(Ccd+Cr))\times I \quad \text{Expression (1)}$$

Cr: the capacitance of the current resonance capacitor 108
Ccd: the capacitance of the capacitor 201

A configuration is discussed that does not include the input AC voltage correction circuit and the nonlinear correction circuit but only includes the current detection circuit. The current Icd causes a voltage Vcd across both the ends of the resistor 205. In the case only with the current detection circuit, the voltage Vcd caused across both the ends of the resistor 205 is as follows.

$$Vcd=Icd\times Rcd \quad \text{Expression (2)}$$

Rcd: the resistor value of the resistor 205
(applicable, in the case where resistor components after the OCP terminal are large and can be ignored)

Provided that the peak value of the current I is Ipeak, this value can be represented by the following expression.

$$Ipeak=Vdch/X \quad \text{Expression (3)}$$

Vdch: plus terminal voltage of the primary smoothing capacitor 105
X: the combined reactance of the leakage inductance of the transformer 115 and the current resonance capacitor 108
Furthermore, $$X=2\times\pi\times f\times Lr-1/(2\times\pi\times f\times Cr) \quad \text{Expression (4)}$$

f: the switching frequencies of the FETs 106 and 107 controlled by the power supply control IC 110
Lr: the leakage inductance of the transformer 115
Cr: the capacitance of the current resonance capacitor 108
That is, $$Ipeak=Vdch/(2\times\pi\times f\times Lr-1/(2\times\pi\times f\times Cr)) \quad \text{Expression (5)}$$

Here, the power supply control IC 110 controls the switching frequencies of the FETs 106 and 107 to hold the relationship of Ipeak such that Ipeak a $\propto$ 1/Vdch, i.e., Ipeak $\propto$ 1/input AC voltage. This relationship holds for allowing the power supply control IC 110 to control the switching frequencies of the FETs 106 and 107 such that, in the case of outputting a constant power on the secondary side, the power on the primary side is also constant, as described above. For instance, when the input AC voltage is high, the power supply control IC 110 controls the switching frequencies of the FETs 106 and 107 to reduce the current flowing on the primary side. When the input AC voltage is low, the power supply control IC 110 controls the switching frequencies of the FETs 106 and 107 to increase the current flowing on the primary side. As a result, a relationship, I$\propto$1/(input AC voltage), also holds. Accordingly, relationships, Icd$\propto$1/(input AC voltage), and Vcd$\propto$1/(input AC voltage) hold according to Expression (1).

In FIG. 2A, in consideration of a configuration that does not include the current detection circuit (however, except for the resistor 205 shared with the input AC voltage correction circuit) but includes the input AC voltage correction circuit and the nonlinear correction circuit, the following relationships hold. That is, provided that a voltage Vacr is caused across both the ends of the resistor 205, the voltage Vacr is according to input voltage, and represented by the following expression. That is, the voltage Vacr caused across both the ends of resistor 205 in the case of including the input AC voltage correction circuit and the nonlinear correction circuit (but does not include the current detection circuit) has a value according to the input voltage.

In the Case of Low Input Voltage>

$$Vacr=(((R304+R305)/((R304+R305)+R302))\times Vdch\times ON\_DUTY)/(ON\_DUTY+R/(R304+R305)\times OFF\_DUTY) \quad \text{Expression (6)}$$

R304: the resistor value of the resistor 304
R305: the resistor value of the resistor 305
R302: the resistor value of the resistor 302
R: the combined resistor of the resistor 304, the resistor 305 and the resistor 302
Vdch: the plus terminal voltage of the primary smoothing capacitor 105
ON_DUTY: the duty ratio in the on state of the FET 107
OFF_DUTY: the duty ratio in the off state of the FET 107
(note that the forward direction voltage of the diode 301 is ignored).

Expression (6) is described. If the diode 301 is not connected and the circuit only includes the resistor 302, the following relationship holds.

$$Vacr=(((R304+R305)/((R304+R305)+R302))\times Vdch\times ON\_DUTY)/(ON\_DUTY+OFF\_DUTY) \quad \text{Expression (8)}$$

However, if the diode 301 is connected, the potential discharged from the capacitor 303 during the FET 107 being in the off state decreases by a ratio R/(R304+R305). More specifically, the ratio R/R205 is "(the resistor value of the combined resistor of the resistor 304, the resistor 305 and the resistor 302)/(the resistor value of the resistor 304 and the resistor 305)".

Thus, Expression (6) is acquired by multiplying OFF_DUTY of Expression (8) by R/(R304+R305). Here, Vdch a input AC voltage. Accordingly, the relationship which is Vacr $\propto$ input AC voltage holds.

In the Case of High Input AC Voltage>

$$Vacr=\{((R304/(R304+R302))\times(Vdch-Vz306)\times ON\_DUTY)/(ON\_DUTY+R/R304\times OFF\_DUTY)\}+Vz306 \quad \text{Expression (7)}$$

Vz306: the Zener voltage of the Zener diode 306

Expression (7) is described. In the case of a high input AC voltage, the voltage applied across both the ends of the resistor 305 is clamped by the Zener diode 306. Accordingly, the resistor 305 is deleted from Expression (6). The Zener voltage of the Zener diode 306 is subtracted from Vdch. Finally, the Zener voltage of the Zener diode 306 is added, thereby acquiring Expression (7).

As described above, provided that the voltage Vocp is the voltage of the OCP terminal of the power supply control IC 110 during the power supply apparatus in operation, the following relationship holds.

$$Vocp \pm (Vcd + Vacr)/2 \qquad \text{Expression (9)}$$

As described above, the value of Vcd exhibits nonlinear characteristics to variation in the input AC voltage (401 in FIG. 2B). To causes the voltage Vocp of the OPC terminal to have a constant value independent of the input AC voltage in conditions where the constant current in the load 128 and the voltage of the voltage output unit 127 are constant, the following configuration is adopted. That is, the configuration is adopted where the output voltage characteristics of the input AC voltage correction circuit and the nonlinear correction circuit are configured to have nonlinear characteristics with a slope which has the same slope but the positive and the negative signs of Vcd are inverted (402 in FIG. 2B). Accordingly, in the case where the current of the load 128 is constant, the overcurrent protection operation can be performed by adjusting each of constants of the following components such that the voltage Vocp of the OPC terminal of the power supply control IC 110 is constant independently of the input AC voltage.

The current detection circuit: the capacitors 201 and 204 and the resistor 205.

The input AC voltage correction circuit: the capacitor 303 and the resistors 304 and 305.

The nonlinear correction circuit: the resistors 304 and 305 and the Zener diode 306.

[Description on Operation of Power Supply Apparatus]

The operation of the power supply apparatus of this embodiment is described using the schematic waveforms in FIG. 2B. The waveforms illustrated in FIG. 2B represent the values of the input AC voltage and Vocp, Vcd and Vacr in the case where the current of the load 128 is in the same condition. More specifically, the waveform 401 is the voltage Vcd caused across both the ends of the resistor 205 in the case of a configuration that does not include the input AC voltage correction circuit and the nonlinear correction circuit for each input voltage but includes the current detection circuit. The waveform 402 represents Vacr in the case with no current detection circuit for each input voltage. The waveform 403 represents the voltage Vocp of the OCP terminal of the power supply control IC 110 for each input voltage in this embodiment illustrated in FIG. 1. In this embodiment, even if the output voltage of the current detection circuit is nonlinear to the input voltage, correction through the input AC voltage correction circuit and the nonlinear correction circuit enables the voltage Vocp of the OCP terminal of the power supply control IC 110 to be constant. The voltage Vocp is thus allowed to be constant independently of the input voltage, thereby enabling the overcurrent protection operation to be performed in a state where the current of the load 128 is always constant.

In this embodiment, the overcurrent protection operation can be performed independently of the input voltage in the state where the current of the load 128 is always constant. This operation negates the need to consider variation in the overcurrent protection operation due to the input voltage, on the off-resonance phenomenon, which is a phenomenon where flow-through current occurs in both the FETs 106 and 107. Accordingly, the sizes of the transformer 115 and the current resonance capacitor 108 can be reduced. Furthermore, in this embodiment, as illustrated in FIG. 1, an original voltage on which input AC voltage correction is performed by the input AC voltage correction circuit and the nonlinear correction circuit is the voltage of the plus terminal of the primary smoothing capacitor 105. The voltage of the plus terminal of the primary smoothing capacitor 105 is input into the input AC voltage correction circuit and the nonlinear correction circuit after the FET 106 becomes the on state. Thus, the input AC voltage correction circuit and the nonlinear correction circuit of this embodiment consume power when the power supply apparatus operates. Accordingly, while the apparatus embedded with the power supply apparatus, for instance, operates in a sleep mode or the power supply switch is off, the input AC voltage correction circuit and the nonlinear correction circuit of this embodiment consume no power. Here, the sleep mode is a state of a power saving operation with reduced power consumption (power saving mode). In this embodiment, the nonlinear correction circuit includes the Zener diode 306 and the resistors 304 and 305. Alternatively, this circuit may include a varistor and/or a diode.

As described above, this embodiment can achieve reduction in size of the apparatus while improving the overcurrent detection accuracy.

Embodiment 2

[Configuration of Power Supply Apparatus]

Figure 3A:
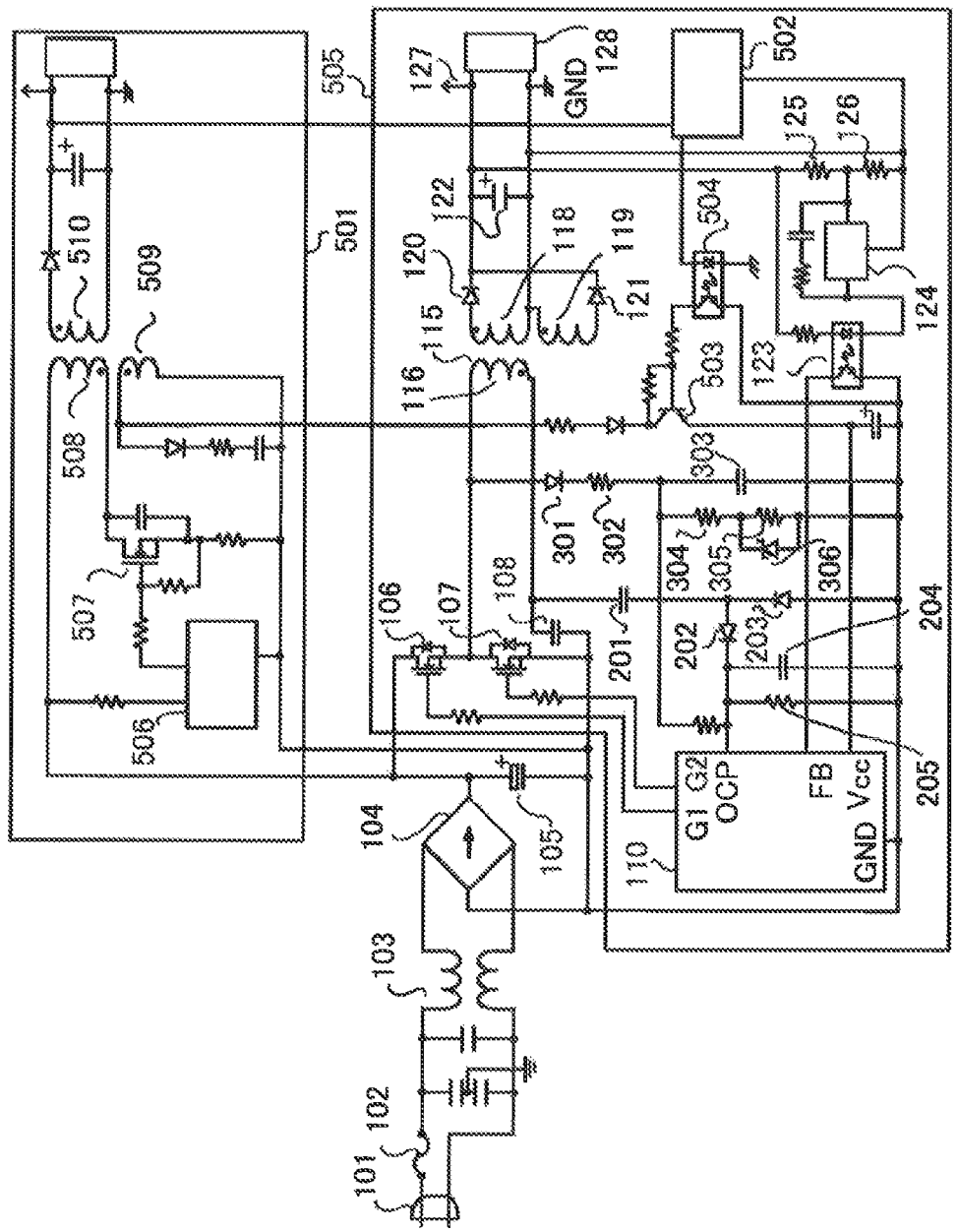
FIGS. 3A and 3B illustrate circuits of current resonance power supply apparatuses of Embodiment 2.

FIG. 3A is a diagram illustrating a circuit of a power supply apparatus of Embodiment 2. This embodiment is an example that provides an overcurrent detection circuit with the input AC voltage correction function illustrated in Embodiment 1, and further achieves power saving. The power supply apparatus common to the apparatus of Embodiment 1 has the same components and operation. Accordingly, the same symbols are assigned, and the description thereof is omitted.

(All-Night Power Supply 501)

An all-night power supply 501, which serves as an external power supply for the current resonance power supply 505 in FIG. 3A, is a power supply that is always in the on state and operates in a non-stop manner while the input AC voltage is supplied. The all-night power supply 501 illustrated in FIG. 3A includes, for instance, a feedback circuit and an overcurrent protection circuit. However, the power supply may be a switching power supply that adopts an insulated transformer including an auxiliary winding 509. Description on the detailed configuration is omitted. The all-night power supply 501 includes a power supply IC 506 that controls the operation of the all-night power supply 501, and a switching element 507 whose switching operation is controlled by the power supply IC 506. The all-night power supply 501 includes a transformer. The transformer includes a primary winding 508, an auxiliary winding 509 and a secondary winding 510. In this embodiment, power is supplied from the auxiliary winding 509 of the transformer of the all-night power supply 501, to the Vcc terminal, which is the power supply terminal of the power supply control IC 110 of the current resonance power supply 505, which is a non-all-night power supply. Here, the non-all-night power supply is a power supply that can switch the state to the on state and the off state. According to this configuration, the control unit 502, which is a control device, controls power supply to the Vcc terminal of the power supply control IC 110, thereby allowing turning on and off the operation of the current resonance power supply 505, which is the non-all-night power supply. That is, the control unit 502 functions as a voltage supply control device for the current resonance power supply 505 to the power supply control IC 110.

The control unit 502 is supplied with power from the all-night power supply 501. Accordingly, if the operation of the current resonance power supply 505 is not required, the control unit 502 only operates the all-night power supply 501, thereby allowing the operation of the current resonance power supply 505 to be stopped. Thus, this embodiment can achieve power saving operation, such as the sleep mode. The power supply apparatus illustrated in FIG. 3A can suppress power consumption as much as possible in the sleep mode. Accordingly, this suppression results in further power saving.

(Configuration of Current Resonance Power Supply 505)

As with Embodiment 1, the current resonance power supply 505 described in this embodiment is embedded with the overcurrent detection circuit that includes the current detection circuit, the input AC voltage correction circuit and the nonlinear correction circuit. The same symbols are assigned to the same components as the components in FIG. 1 of Embodiment 1. The description thereof is omitted. In the sleep mode, the control unit 502 stops the current resonance power supply 505. Accordingly, the FET 106 is not turned on. No power is therefore consumed by the input AC voltage correction circuit. That is, as illustrated in FIG. 3A, the configuration of the input AC voltage correction circuit can perform the input AC voltage correction on the overcurrent detection circuit during the current resonance power supply 505 being in operation without increasing the power consumption in the sleep mode.

More specifically, the control unit 502 controls power supply from the all-night power supply 501 to the power supply control IC 110, as follows. The control unit 502 outputs, for instance, a low level signal to the photocoupler 504 while the apparatus is not in the power saving mode. At this time, no current flows into an LED of the photocoupler 504, and the phototransistor of the photocoupler 504 is in the off state. While the phototransistor of the photocoupler 504 is in the off state, the transistor 503 as the second shut off unit is in the on state, and a voltage is input from the auxiliary winding 509 of the transformer of the all-night power supply 501 to the Vcc terminal of the power supply control IC 110. On the other hand, when the apparatus transitions to the power saving mode, the control unit 502 outputs, for instance, a high level signal to the photocoupler 504. At this time, current flows through the LED of the photocoupler 504, and the phototransistor of the photocoupler 504 becomes the on state. When the phototransistor of the photocoupler 504 becomes the on state, the transistor 503 becomes the off state, and no voltage is input from the auxiliary winding 509 of the transformer of the all-night power supply 501 to the Vcc terminal of the power supply control IC 110. That is, the operation of the current resonance power supply 505 is stopped.

[Modification of Input AC Voltage Correction Circuit]

Figure 3B:
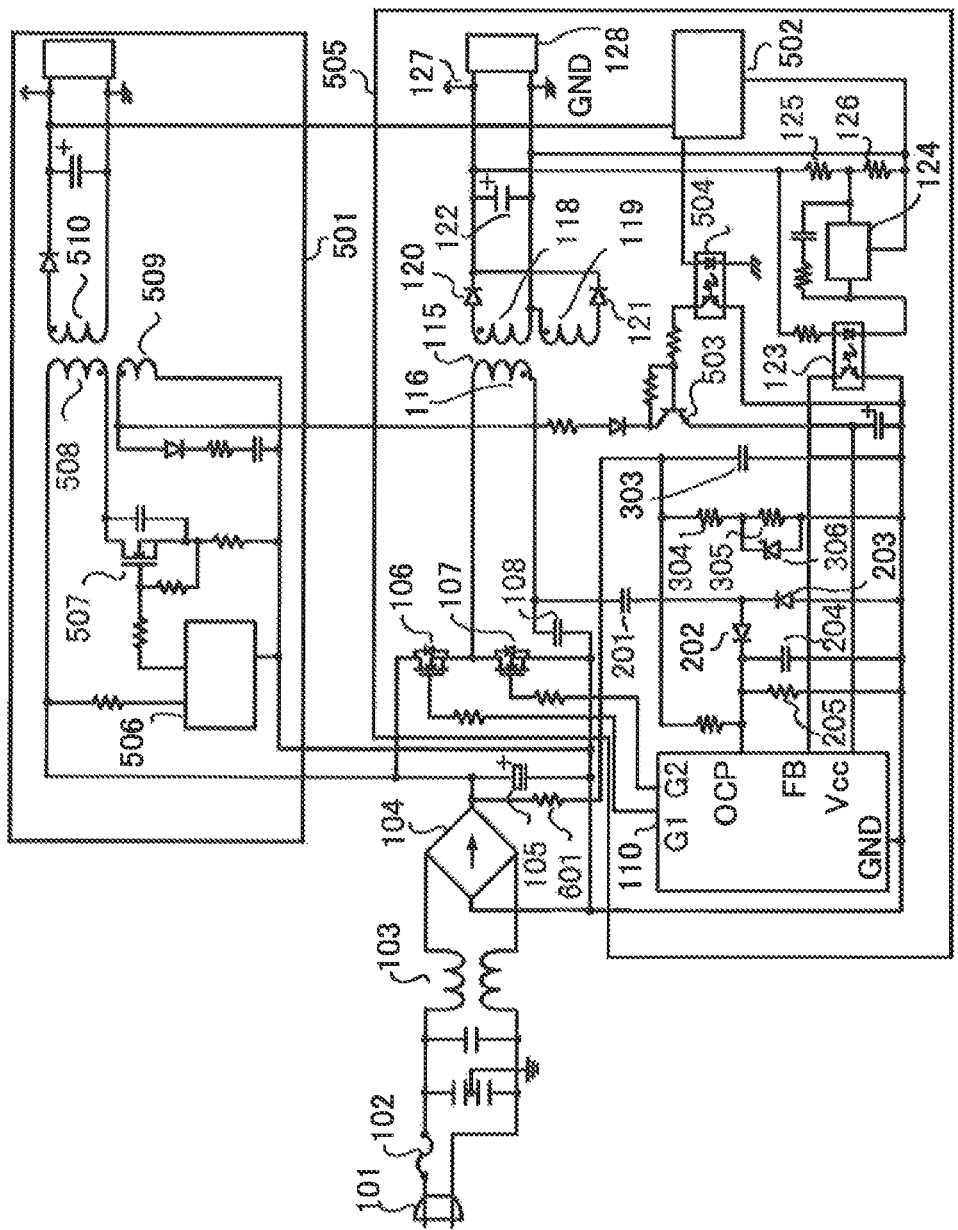

Other than the input AC voltage correction circuit having the configuration illustrated in FIG. 3A, a configuration of performing the input AC voltage correction can be implemented. For instance, a configuration illustrated in FIG. 3B is an example thereof. The same symbols are assigned to the same components as the components in FIG. 3A. The description thereof is omitted. In FIG. 3B, the diode 301 and the resistor 302 connected between the primary winding 116 of the transformer 115 and the capacitor 303 in FIG. 3A are eliminated, and a resistor 601 is connected between the DC voltage output terminal of the rectifier diode bridge 104 and the capacitor 303. In the configuration in FIG. 3B, the voltage of the plus terminal of the primary smoothing capacitor 105 is input into the input AC voltage correction circuit, which includes the resistor 601 and the resistor 205. The operation of the input AC voltage correction circuit in FIG. 3B is similar to the operation of the input AC voltage correction circuit in FIG. 3A. Accordingly, the description thereof is omitted. The power supply apparatus illustrated in FIG. 3B can also achieve reduction in size of the apparatus while improving the overcurrent detection accuracy. In the input AC voltage correction circuit in FIG. 3B, the voltage of the plus terminal of the primary smoothing capacitor 105 serves as power supply, and power is consumed by the resistor 601, the resistor 205, the resistor 304, the resistor 305 and the Zener diode 306.

As described above, this embodiment can achieve reduction in size of the apparatus while improving the overcurrent detection accuracy. Furthermore, the power supply apparatus in FIG. 3A can perform the input AC voltage correction without increasing the power consumption.

Embodiment 3

[Configuration of Power Supply Apparatus]

Figure 4A:
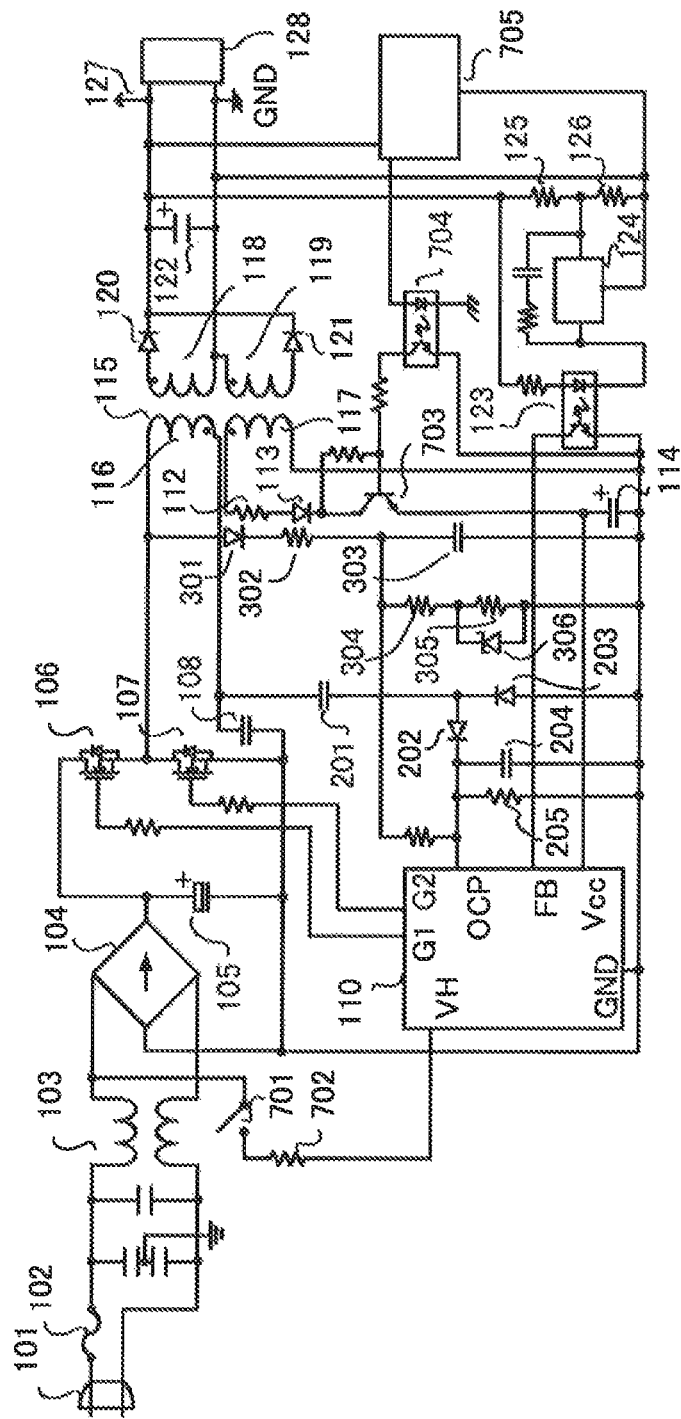
FIGS. 4A and 4B illustrate circuits of current resonance power supply apparatuses of Embodiment 3.

FIG. 4A is a diagram illustrating a circuit of a power supply apparatus of Embodiment 3. This embodiment is an example where the overcurrent detection circuit allowed to have the input AC voltage correction function described in Embodiment 1, and power saving is achieved during the power supply switch being off. The same symbols are assigned to the same components described in Embodiment 1. The description thereof is omitted. The power supply apparatus in FIG. 4A includes: a power supply switch 701, a startup resistor 702; a transistor 703, which is a first shut off unit; a photocoupler 704; and a control unit 705, which is a control device. The power supply apparatus illustrated in FIG. 4A has a configuration where turning on the power supply switch 701 supplies a startup voltage to the VH terminal of the power supply control IC 110 via the startup resistor 702 and starts up the power supply apparatus. One end of the power supply switch 701 is connected to the input terminal of the rectifier diode bridge 104. This switch connects and disconnects the AC voltage.

A power supply switch detection unit, which detects the on and off states of the power supply switch 701 but is not illustrated, is connected to the control unit 705. Thus, the control unit 705 can cause the power supply switch detection unit to detect one of the on (connection) state and the off (disconnection) state of the power supply switch 701. When the control unit 705 causes the power supply switch detection unit to detect the off state of the power supply switch 701, this control unit determines that the input of the AC voltage is disconnected and outputs, for instance, a high level signal to the photocoupler 704. At this time, current flows through the LED of the photocoupler 704, and the phototransistor of the photocoupler 704 becomes the on state. When the phototransistor of the photocoupler 704 becomes the on state, the transistor 703 is turned off. As a result, the voltage of the auxiliary winding 117 of the transformer 115 is not input into the Vcc terminal of the power supply control IC 110, and the power supply apparatus is stopped. While the control unit 705 causes the power supply switch detection unit to detect the on state of the power supply switch 701, this control unit outputs, for instance, a low level signal to the photocoupler 704. At this time, no current flows through the LED of the photocoupler 704, and the phototransistor of the photocoupler 704 is in the off state. Accordingly, the transistor 703 is in the on state, and a voltage is supplied from the auxiliary winding 117 of the transformer 115 to the Vcc terminal of the power supply control IC 110.

The configuration of the power supply apparatus in FIG. 4A allows the control unit 705 to determine to stop the power supply apparatus even if the power supply switch 701 is abruptly turned off. Accordingly, at stop of the power supply apparatus, various processes can be performed and then the power supply apparatus can be stopped.

Only if the power consumption at the off state of the power supply switch 701 can be suppressed in the power supply apparatus illustrated in FIG. 4A, further power saving can be achieved. In the configuration of the power supply apparatus illustrated in FIG. 4A, the FET 106 is in the off state during the power supply switch 701 being off. Accordingly, the input AC voltage correction circuit consumes no power. Furthermore, during operation of the power supply apparatus in the on state of the power supply switch 701, the overcurrent detection circuit can be corrected according to the input AC voltage using the drain-source voltage of the FET 107. That is, the power supply apparatus illustrated in FIG. 4A can correct the input AC voltage while suppressing the power consumption in the off state of the power supply switch 701.

[Modification of Input AC Voltage Correction Circuit]

Figure 4B:
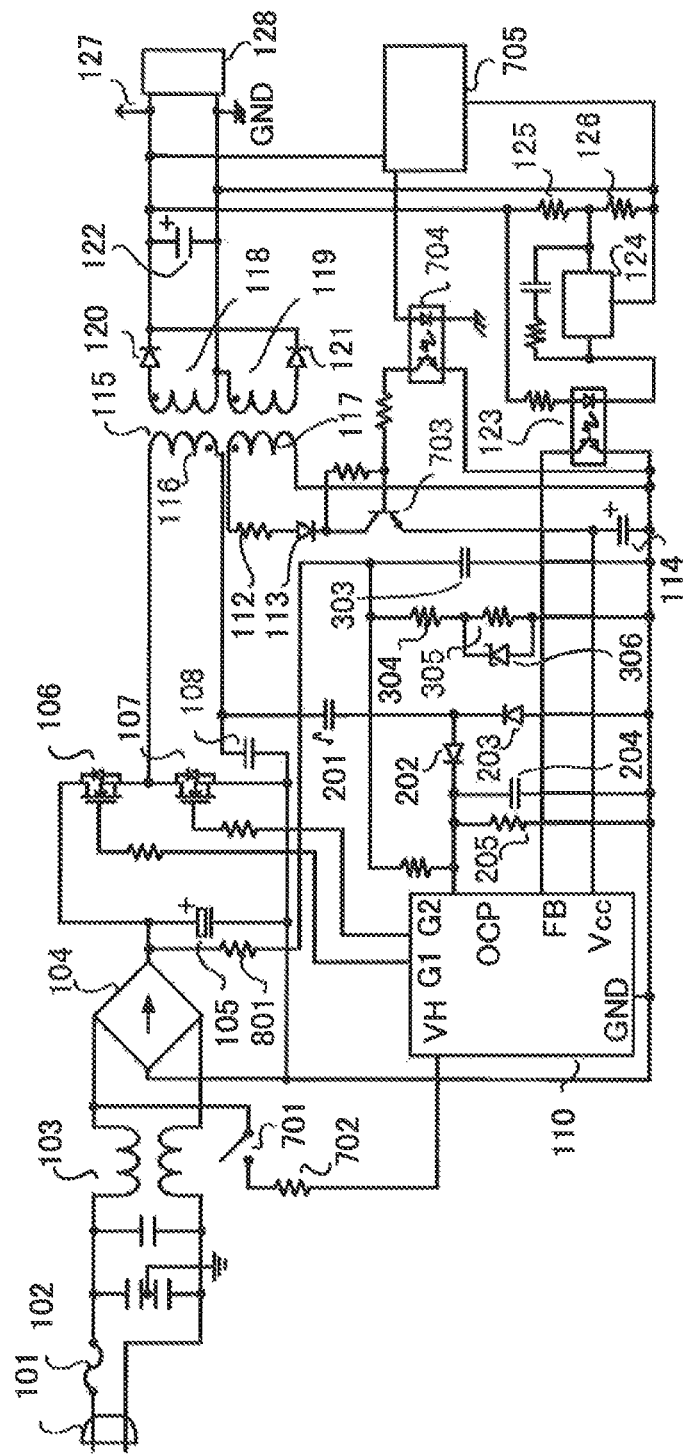

Other than the input AC voltage correction circuit illustrated in FIG. 4A, a configuration of performing input AC voltage correction can be implemented. For instance, a configuration illustrated in FIG. 4B is an example thereof. The operation of the input AC voltage correction circuit in FIG. 4B is similar to the operation of the input AC voltage correction circuit in FIG. 4A. Accordingly, the description thereof is omitted. The power supply apparatus illustrated in FIG. 4B can also achieve reduction in size of the apparatus while improving the overcurrent detection accuracy. More specifically, in the power supply apparatus in FIG. 4B, the voltage of the plus terminal of the primary smoothing capacitor 105 serves as a power supply, and input AC voltage correction can be performed on the overcurrent detection circuit using the voltage based on the resistor values of the resistor 801 and the resistor 205. In the power supply apparatus in FIG. 4B, even if the power supply switch 701 is in the off state, the resistor 801 and the resistor 205 consume power while the voltage of the plus terminal of the primary smoothing capacitor 105 serves as power supply.

As described above, this embodiment can achieve reduction in size of the apparatus while improving the overcurrent detection accuracy. Furthermore, the power supply apparatus in FIG. 4A can reduce the power consumption during the power supply being off.

Embodiment 4

The power supply apparatuses described in Embodiments 1 to 3 are applicable as power supplies for supplying power to, for instance, low voltage power supplies of image forming apparatuses, i.e., drive units, such as controllers (control devices) and motors. A configuration of an image forming apparatus to which any of the power supply apparatuses of Embodiments 1 to 3 is applied is hereinafter described.

[Configuration of Image Forming Apparatus]

Figure 5:
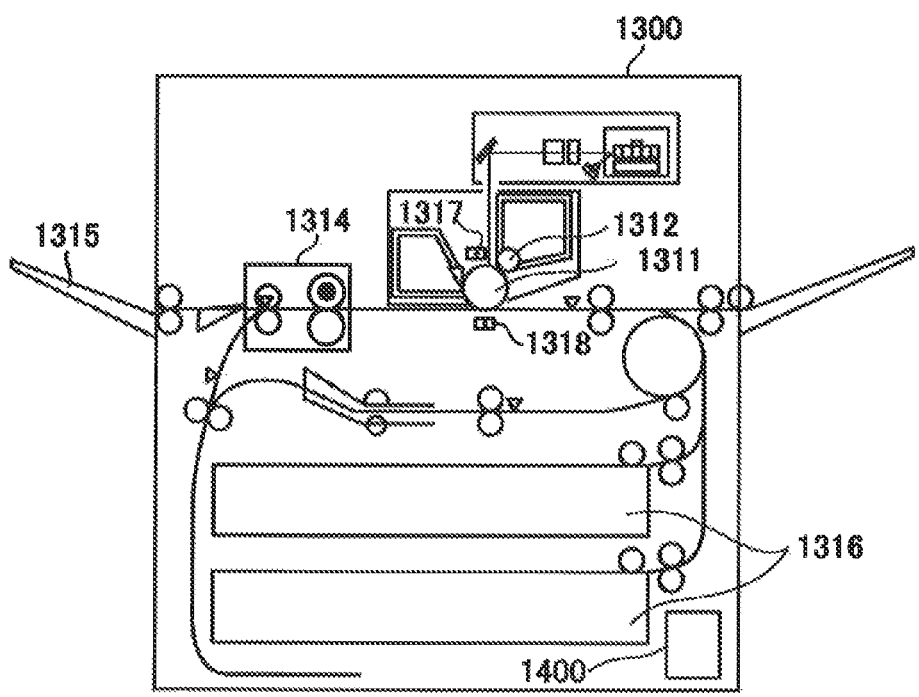
FIG. 5 illustrates a configuration of an image forming apparatus of Embodiment 4.

As an example of an image forming apparatus, a laser beam printer is exemplified and described. FIG. 5 illustrates a schematic configuration of a laser beam printer, which is an example of an electrophotographic printer. The laser beam printer 1300 includes: a photosensitive drum 1311, which is an image bearing member on which an electrostatic latent image is to be formed; and a charging unit 1317 that uniformly charges the photosensitive drum 1311. The laser beam printer 1300 further includes a developing unit 1312 that develops, with toner, the electrostatic latent image formed on the photosensitive drum 1311. The toner image developed on the photosensitive drum 1311 is then transferred by a transfer unit 1318 onto a sheet (not illustrated), which is a recording material supplied from a cassette 1316. The toner image transferred on the sheet is fixed by a fixing device 1314, and ejected onto a tray 1315. The photosensitive drum 1311, the charging unit 1317, the developing unit 1312 and the transfer unit 1318 configure the image forming unit. The laser beam printer 1300 includes any of the power supply apparatuses 1400 described in Embodiments 1 to 3. The image forming apparatuses to which the power supply apparatuses 1400 of Embodiments 1 to 3 are applicable are not limited to what is exemplified in FIG. 5. Alternatively, for instance, an image forming apparatus that includes multiple image forming units can be implemented. Furthermore, an image forming apparatus can be implemented that includes a primary transfer unit that transfers a toner image on a photosensitive drum 1311 onto an intermediate transfer belt, and a secondary transfer unit that transfers the toner image on the intermediate transfer belt onto a sheet.

The laser beam printer 1300 includes a controller that controls an image forming operation through the image forming unit and a sheet conveyance operation, but is not illustrated. The power supply apparatuses 1400 described in Embodiments 1 to 3, for instance, supply power to the controller. The controller of this embodiment corresponds to the control units 502 and 705 of Embodiments 2 and 3. The power supply apparatuses 1400 described in Embodiments 1 to 3 supply power to drive units, such as motors for driving various rollers for rotating the photosensitive drum 1311 or conveying a sheet. That is, the loads 128 in Embodiments 1 to 3 correspond to the controller and the drive unit. The image forming apparatus of this embodiment can operate in a normal operation mode that is a first mode for performing an image forming operation, and a power saving mode that is a second mode with power consumption lower than consumption of the normal operation mode. In a standby state (e.g., the power saving mode, standby mode, and sleep mode) for achieving power saving, the image forming apparatus of this embodiment reduces the load, such as by supply of power only to, e.g., the controller, to allow the power consumption to be reduced. That is, the image forming apparatus of this embodiment can reduce the power consumption by stopping the operation of the current resonance power supply 505, which is the non-all-night power supply, in the power saving mode, as described in Embodiment 2.

As described above, this embodiment can achieve reduction in size of the apparatus while improving the overcurrent detection accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-146375, filed Jul. 12, 2013, which is hereby incorporated by reference herein in its entirety.

What is claimed is:

1. A power supply apparatus comprising:
  a transformer that includes a primary winding, a secondary winding and an auxiliary winding;
  a switching unit that includes first and second switching elements that are connected in series, and drives the primary winding;
  a resonance capacitor that is connected to one end of the primary winding;
  a control device that controls the first switching element and the second switching element to be alternately turned on and off, for resonating the primary winding and the resonance capacitor to output a DC voltage to a load connected to the secondary winding;
a detection unit that detects current flowing through the primary winding and outputs a voltage corresponding to the detected current;
a correction unit that corrects the voltage output from the detection unit into a voltage proportional to a variation of an input voltage input into the primary winding of the transformer; and
a nonlinear correction unit that corrects the corrected voltage corrected by the correction unit to be nonlinear independently of variation in the input voltage,
wherein the control device detects that the power supply apparatus is in an overcurrent state, based on the corrected voltage by the nonlinear correction unit.

2. A power supply apparatus according to claim 1, wherein the detection unit is connected between the primary winding and the resonance capacitor.

3. A power supply apparatus according to claim 1, wherein the correction unit is connected between one end of the transformer and a connection point between the first switching unit and the second switching unit.

4. A power supply apparatus according to claim 1, wherein the control device operates by receiving a voltage induced in the auxiliary winding of the transformer.

5. A power supply apparatus according to claim 1, wherein the control device operates by receiving a voltage output from an external power supply.

6. A power supply apparatus according to claim 2, wherein the detection unit comprises:
a first capacitor having a first end connected between the one end of the primary winding and the resonance capacitor;
a first diode having an anode connected to a second end of the first capacitor;
a second diode having a cathode connected to the second end of the first capacitor;
a second capacitor connected to a cathode of the first diode; and
a first resistor having a first end connected to the cathode of the first diode.

7. A power supply apparatus according to claim 3, wherein the correction unit comprises:
a third diode having an anode connected to one end of the primary winding;
a second resistor having a first end connected to a cathode of the third diode;
a third capacitor connected to a second end of the second resistor;
a third resistor having a first end connected to the second end of the second resistor; and
a fourth resistor connected to the second end of the third resistor.

8. A power supply apparatus according to claim 4, further comprising:
a rectification unit that rectifies an input AC voltage;
a smoothing capacitor that smooths the voltage rectified by the rectification unit;
a switch having a first end connected to an input terminal of the rectification unit for the AC voltage, the switch connecting or disconnecting the input of the AC voltage; and
a first shut-off unit that is connected between the auxiliary winding and the control device, and shuts off an input of a voltage from the auxiliary winding.

9. A power supply apparatus according to claim 5, further comprising:

a second shut-off unit that shuts off the input of the voltage from the external power supply.

10. A power supply apparatus according to claim 7, wherein the nonlinear correction unit comprises the third resistor, the fourth resistor, and a Zener diode connected in parallel to the fourth resistor.

11. An image forming apparatus comprising:
an image forming unit that forms an image; and
a power supply that supplies power for operating the image forming unit,
wherein the power supply comprises:
a transformer that includes a primary winding, a secondary winding and an auxiliary winding;
a switching unit that includes first and second switching elements that are connected in series, and drives the primary winding;
a resonance capacitor that is connected to one end of the primary winding;
a control device that controls the first switching element and the second switching element to be alternately turned on and off, for resonating the primary winding and the resonance capacitor to output a DC voltage to a load connected to the secondary winding;
a detection unit that detects current flowing through the primary winding and outputs a voltage corresponding to the detected current;
a correction unit that corrects the voltage output from the detection unit into a voltage proportional to a variation of an input voltage input into the primary winding of the transformer; and
a nonlinear correction unit that corrects the corrected voltage corrected by the correction unit to be nonlinear independently of variation in the input voltage, and
wherein the control device detects that the power supply apparatus is in an overcurrent state, based on the corrected voltage by the nonlinear correction unit.

12. An image forming apparatus according to claim 11, further comprising:
a controller that controls an image forming operation that is performed by the image forming unit,
wherein the power supply supplies power to the controller.

13. An image forming apparatus according to claim 11, further comprising:
a rectification unit that rectifies an input AC voltage;
a smoothing capacitor that smooths the input voltage rectified by the rectification unit;
a switch having a first end connected to an input terminal of the rectification unit for the AC voltage, the switch connecting or disconnecting the input of the AC voltage; and
a first shut-off unit that is connected between the auxiliary winding and the control device, and shuts off an input of a voltage from the auxiliary winding.

14. An image forming apparatus according to claim 11, wherein the control device operates by receiving a voltage output from an external power supply.

15. An image forming apparatus according to claim 14, a second shut-off unit that shuts off the input of the voltage from the external power supply.

16. An image forming apparatus according to claim 15, wherein the image forming apparatus can operate in a first mode and a second mode that has lower power consumption than the first mode has, and
the controller causes the second shut-off unit to shut off the input of the voltage from the external power supply to the control device, according to transition from the first mode to the second mode.

* * * * *